INVENTOR.
JOHN S. KURTZ
JEWEL GRAVES
BY
ATTORNEYS

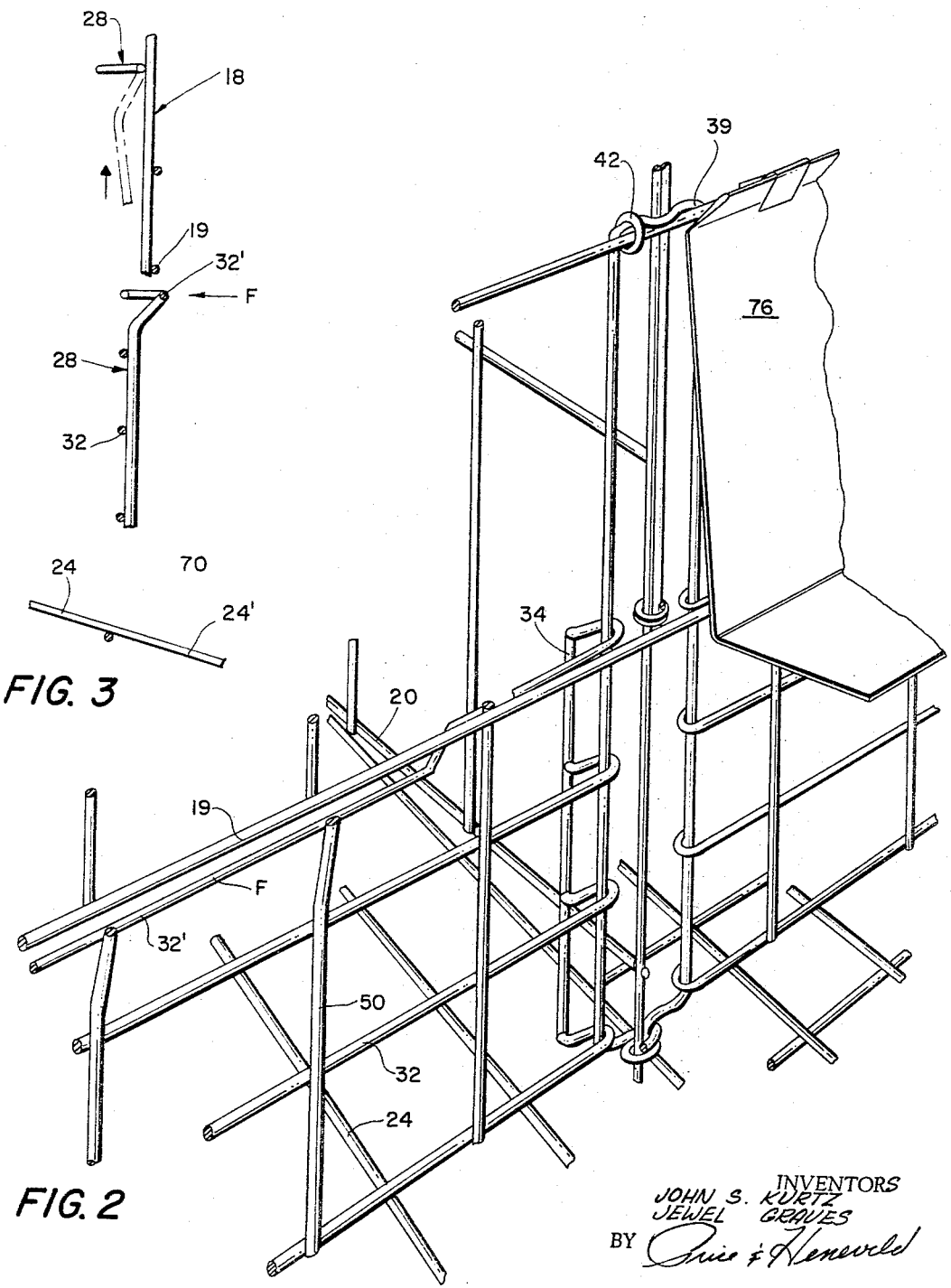

United States Patent Office 3,330,254
Patented July 11, 1967

3,330,254
POULTRY CAGE AND BOTTOM GATE
CONSTRUCTION
John S. Kurtz, Ephrata, Pa., and Jewel Graves, Holland, Mich., assignors to Big Dutchman, Inc., Zeeland, Mich., a corporation of Michigan
Filed Nov. 24, 1965, Ser. No. 509,585
6 Claims. (Cl. 119—17)

This invention relates to cage equipment for domesticated fowl such as poultry, and more particularly relates to a novel poultry cage and gate assembly.

Elongated rows of individual cages, containing hundreds or even thousands of domesticated fowl, are commonplace in the poultry industry today. Each cage normally contains several birds closely grouped. They are automatically fed and watered from external supply troughs, and the eggs roll from the cages onto external egg collection means.

One particular problem occurring with poultry cage equipment is created with removal of an individual bird from a cage normally containing several birds. A person's arm and hand extending down into the cage and between the birds to grasp and remove a bird creates wild noisy excitement among all of the birds, causing them to panic and pack into a corner of the cage. This frightened packing of the already closely grouped birds can and frequently does cause injury to the birds. Moreover, the exictement sometimes spreads to birds in adjacent cages also, thereby compounding the problem.

It is an object of this invention to provide an improved fowl cage and gate construction enabling individual birds to be readily removed from the cage without significant excitement occurring among the birds to cause uncontrolled panic, packing, and potential injury.

Another object of this invention is to provide a poultry cage and gate construction enabling access to the cage by a person to remove a bird, yet without significant excitement being created among the birds, by effecting removal of the bird through a special bottom access opening. This allows a bird to be grabbed by its legs, and pulled out of the group without their seeing any foreign object or person entering the cage. It has been found that a bird can be thus removed with very little noise from that bird and with practically no noise from the other birds in the cage.

Another object of this invention is to provide a fowl cage and bottom gate assembly that can be formed inexpensively of wire elements and that is uniquely cooperative with the wire cage structure to form a sliding construction having a self-contained latching action between the gate and cage, causing the gate to be automatically latched in closed lowered position, and being manually unlatchable with temporary deformation of wire members of the gate.

These and other objects of this invention will become apparent upon studying the following specification in conjunction with the drawings, in which:

FIG. 2 is a fragmentary perspective view of a portion of one cage and gate in FIG. 1; and FIG. 3 is a side elevational sectional view taken on plane III—III of FIG. 1.

Figure 1:
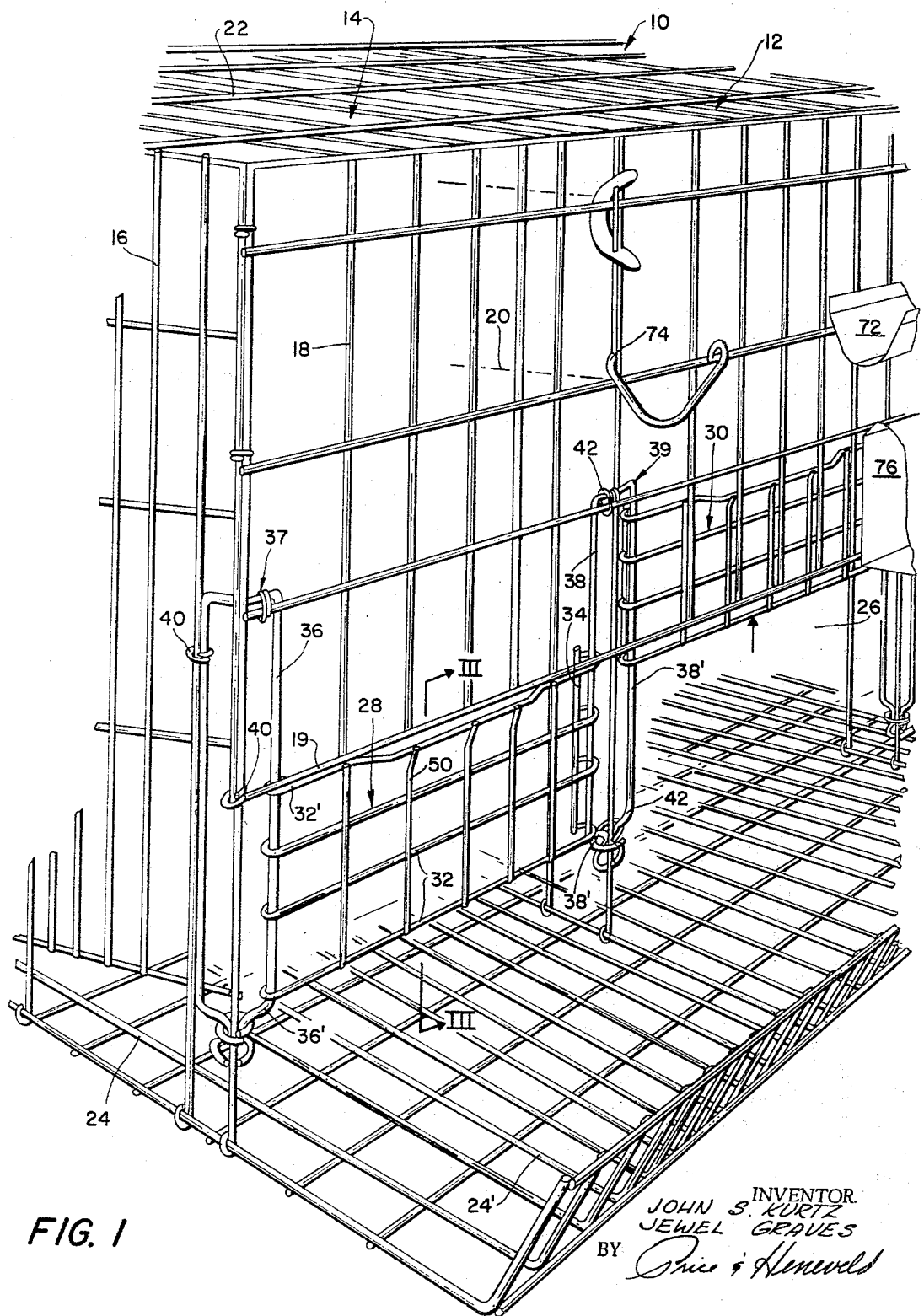
FIG. 1 is a perspective view of a cage row, showing two adjacent cages with gates, one gate being raised and the other gate lowered.

Referring now specifically to the drawings, the poultry cage row assembly 10 includes a plurality of individual cages of which two are shown, namely 12 and 14. The cage row is normally suspended above the floor by overhead or underside support means (not shown).

The birds in the cages are preferably automatically watered and fed using elongated troughs extending from supply means (not shown) and along the sides of the cages. For example, a water trough 72 is suspended along the length of the cage row by suitable hangers 74, and a feed trough 76 is suspended along the cage beneath the water trough.

Each individual cage is formed of a series of panels forming a top, four side walls, and a bottom. Except for the end wall, the side walls are common to adjacent cages in conventional manner. These panels are formed of interconnected wire elements in a mesh. (For purposes of clarity, the drawings do not show all of the wires forming the back and the inner side walls of the cages, since an abundance of wire elements would create confusion in the drawing.) More specifically, side wall 16, front side wall 18, side wall 20 (illustrated by phantom lines), the back wall (not shown in detail), the top 22, and the bottom 24 are all formed of criss crossed, interconnected wires to form a cage enclosure. The front wall 18 terminates short of the bottom to provide an opening giving direct access to the bottom portion of the cage, e.g. opening 26 in cage 12, to allow birds to be inserted and removed from the cage. Since this opening is in the lower portion of the wall, immediately adjacent the floor or bottom of the cage, a person's hand can be reached in directly among the legs of the closely grouped birds without their seeing it. These openings are covered by special gates, specifically, gate assembly 28 for cage 14, and gate assembly 30 for cage 12.

Each of the gates is formed of vertically and horizontally extending, criss-crossed, interconnected wire elements in a mesh. The ends of the horizontally extending wire elements are curled back upon themselves at the opposite side edges of the gates, with the terminal ends preferably being interconnected by bracing vertical wires, e.g. wire 34 on the right end of gate 28 as illustrated in FIG. 1. The ends of the gate therefore form elongated vertical glide sockets. These sockets receive and extend around vertically oriented, fixed slide wires, e.g. 36 and 38 on cage 14, on opposite ends of the access opening, spaced slightly inside the cage front wall, and having a vertical height about twice that of the height of the gate, to extend above the top edge of the opening in an amount about equal to the gate height. It guides and retains the gate as it is shifted up and down between opened and closed positions respectively. These wire members are preferably part of vertically elongated loops attached to the cage construction across the front edges of the side walls, to straddle the common walls between adjacent cages. These straddling loops therefore each include two vertically oriented wire guide members, e.g. 38 and 38' on loop 39 to accommodate the adjacent ends of adjacent gates 28 and 30. The end loop 37 at the end of the cage row to form a slide guide 36 preferably is bent around the vertical outside corner of the cage. These members may be secured to the cage as by suitable wire twist elements 40 for loop 37, and 42 for loop 39. In the preferred form of the construction, the slide wires are spaced slightly inside the front cage wall, so that the gates will slide up the inside face of the cage front wall, when raised.

The bottom access gates are configurated and formed to have a special automatically latching relationship with the upper edge of the access opening, i.e. the elongated element between the opening and the cage front wall thereabove. More specifically, the central, vertically extending wire members 50 of the gate have their upper end portions slanted diagonally upwardly and outwardly of the cage to extend from a position just inside the plane of front wall 18, across the plane, to a position just outside the plane of the wall. The vertical wire members on both sides of these central wires are generally straight, remaining in the main plane of the gate inside the front wall. The upper horizontal wire member 32' which interconnects the upper ends of all of these vertical wires has a central offset to connect the central wires in the plane outside the front wall plane with its two ends remaining in the plane inside the plane of the cage front wall. Thus, the central portion of wire 32' extends across the front wall plane in the closed lowered position of the gate. The abutment of this offset central portion of upper gate edge elongated member 32 with the elongated lowermost wire 19 of the front wall 18 at the top of the access opening prevents the gate from being raised unless the upper portion of the gate is pushed inwardly to a temporarily resiliently deformed position with respect to the cage front wall. Thus, the poultry cannot accidentally raise the gate to escape from the cage. The gate can be easily manually unlatched, however, by merely pressing inwardly against the central portion of the upper edge of the gate, to shift the upper gate portion temporarily to a position on the inside of the plane of the front wall (as illustrated by phantom lines in FIG. 3) at which position the gate can be readily raised so that its edge sockets slide up guide members 36 and 38 to open the cage. This deformation is against the inserent bias of the construction due to the natural resilience of wire members 50, as reinforced by the horizontal wire members. The gate thus acts as a spring member biased toward the offset protruding position shown in FIGS. 1 and 2, but shiftable against the bias to the unlatched position shown in FIG. 3.

With lowering of the gate, the offset central portion springs back to its original position upon passing beneath the lower edge elongated member 19 along the upper edge of the access opening. Hence, the construction, although very simply formed from wire members and therefore inexpensive to produce, achieves not only a bottom access opening for removal of birds without creating a fuss, but also achieves a bottom access opening controlled by a special self-latching gate and cage construction without added catches, added latches, or other added components.

Preferably, the floor 24 of the cages is slanted slightly downwardly and outwardly of the cage, and extended to form an egg collection area 24' in the front of the cages. Since the gate and egg collection means are at the same wall of the cage, an egg roll out opening 70 is left between the cage bottom and the gate lower edge. Stop means such as the bent lower ends 36' and 38' of elements 36 and 38 are therefore provided for the gate, to limit its lowered position.

It is conceivable that various details of this construction may be modified within the concept presented. Hence, the invention is intended to be limited only by the scope of the appended claims and the reasonably equivalent structures to those defined therein.

We claim:

1. A fowl cage and gate assembly comprising: an enclosure cage having a plurality of retaining panels forming a bottom, a top, and four walls; said panels being formed of criss crossed interconnected wires; one of said walls having an access and bird removal opening in the lower portion thereof adjacent said bottom; a gate member over said opening; said cage having vertical gate mounting and guide wires astraddle said opening, positioned inwardly of the side edges of said opening toward the center thereof, spaced slightly from said one wall, and extending above the top of said opening; said gate being formed of criss crossed interconnected wires, the lateral ends of said gate being curled around said guide wires to enable said gate to be slid up and down on said guide wires to open and close the opening, respectively; and latch means between said gate and cage.

2. The fowl cage and gate assembly in claim 1 wherein said latch means is formed of integral interfittable latching portions on said gate and said cage, which interfit to latch in said closed position to latch said gate in closed position and are resiliently manually deformable to release said gate from the latching interfit to open it.

3. A fowl cage and gate assembly comprising: an enclosure cage having a plurality of retaining panels forming walls, a bottom, and top; said panels being formed of criss crossed interconnected wires; one of said walls having an access and bird removal opening in the lower portion thereof adjacent said bottom; a gate member over said opening; vertical sliding connections between the lateral edges of said gate and the adjacent edges of said one wall at said opening to enable said gate to be slid upwardly open and downwardly closed; said cage including an elongated member adjacent the top of said opening; said gate having an elongated latching surface at its upper edge, and having an upper portion slanting diagonally toward said surface; said latching surface being partially outwardly offset of said elongated member in the closed lowered position of said gate to extend across and in abutment with said elongated member to latch said gate in the lowered position, and being manually shiftable against an inherent bias from said offset relation to unlatch and allow said gate to be raised.

4. The fowl cage and gate assembly in claim 3 wherein: said cage has vertical guide wires astraddle said opening, positioned inwardly of the side edges of said opening toward the center thereof, spaced slightly from said one wall, and extending above the top of said opening to allow gate raising; said gate being formed of criss crossed interconnected wires, the lateral ends of said gate being curled around said guide wires to enable said gate to be slid up and down on said guide wires to open and close the opening, respectively.

5. The assembly in claim 4 wherein said cage bottom is slanted toward said one wall to allow eggs to roll thereacross, and wherein stop means is positioned to engage said gate and limit its lowered position to leave an egg roll out opening between the lower edge of said gate and said slanted bottom.

6. The assembly in claim 3 wherein the major portions of said gate are spaced slightly inwardly of said one wall; said gate latching surface, in the closed position of said gate, protrudes outwardly beyond said one wall and is manually shiftable against its inherent bias to an unlatched condition inwardly of said one wall whereby the gate may be raised to open position, and said inherent bias holds said gate latching surface against said one wall when said gate is elevated to hold the gate elevated and open until manually lowered and closed.

References Cited

UNITED STATES PATENTS

| | | | |
|---|---|---|---|
| 969,285 | 9/1910 | Keipper | 119—17 |
| 1,458,736 | 6/1923 | Stewart | 119—17 |
| 1,522,870 | 1/1925 | Dean | 220—19 |
| 1,812,598 | 6/1931 | Macomber | 119—18 |
| 2,252,348 | 8/1941 | Mager | 119—17 |
| 2,612,862 | 10/1952 | Ipsen | 119—18 |

SAMUEL KOREN, *Primary Examiner.*

ALDRICH F. MEDBERY, *Assistant Examiner.*